UNITED STATES PATENT OFFICE.

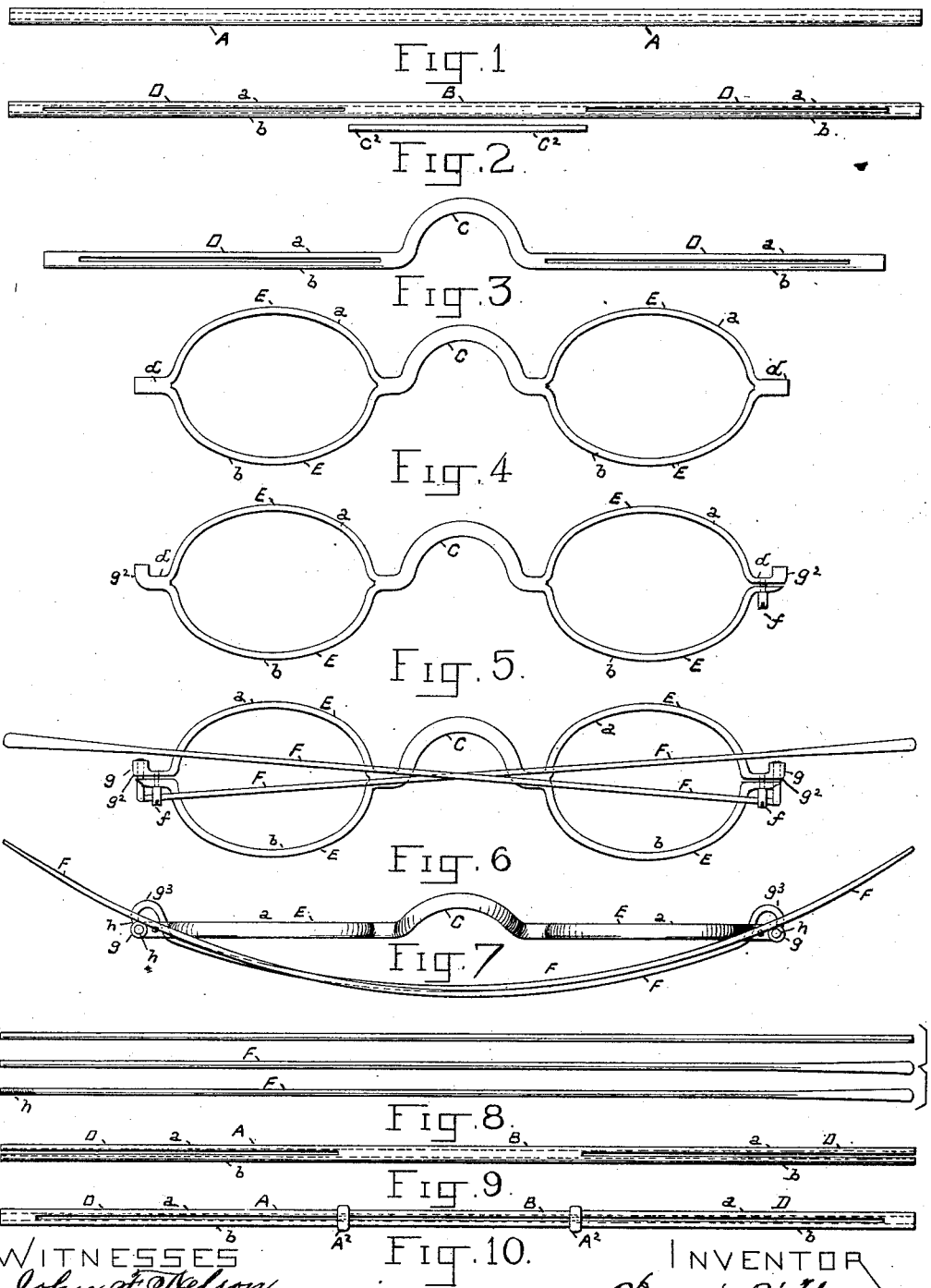

DANIEL O'HARA, OF WALTHAM, MASSACHUSETTS.

MANUFACTURE OF SPECTACLE-FRAMES.

SPECIFICATION forming part of Letters Patent No. 359,171, dated March 8, 1887.

Application filed June 1, 1886. Serial No. 203,802. (No model.)

*To all whom it may concern:*

Be it known that I, DANIEL O'HARA, of Waltham, in the county of Middlesex and State of Massachusetts, have invented certain new and useful Improvements in the Manufacture of Frames for Spectacles and Eyeglasses, of which the following is a full, clear, and exact description.

The objects of this invention, and most successfully attained thereby, are to reduce to the minimum the number of separate pieces required for the frames of spectacles and eyeglasses, to enable the frames to be produced in a most practical and ready manner, and without soldering or brazing the parts, and all so as to require the employment, comparatively, of but little skilled labor, and in the highest degree to enable them to be manufactured with the use of special machinery or tools of most simple construction and easy operation, employing unskilled and untrained and cheap labor, as it may be classed.

This invention consists in an improved mode of making spectacle and eyeglass frames, the same consisting, in substance, in first longitudinally dividing the opposite end portions of a wire, or other suitable blank, into separate branches, and in then opening out said branches into rims to receive the lenses, and bending or otherwise shaping the central portion of the blank for the nose-piece or bridge of the frame, all substantially as hereinafter described; also, in a new and improved joint of the temples to the frame of spectacles and in an abutment for the temples and otherwise, all substantially as hereinafter described.

In the drawings, forming a part of this specification, the present invention is illustrated.

Figures 1 to 7, both inclusive, are views illustrating; Fig. 1, a blank from which to produce a spectacle-frame in accordance with this invention; Figs. 6 and 7, the spectacle-frame completed and the temples attached; Figs. 2 to 5, both inclusive, a blank, such as the blank of Fig. 1, at various stages of its manufacture into a spectacle-frame, and which is shown as completed in Figs. 6 and 7, Fig. 6 being a face or side view, and Fig. 7 an edge view. Fig. 8 is a view of a blank for making the temples of Figs. 6 and 7, and grouping in a series the blank at its various stages of manufacture and previous to being bent into form and attached to the spectacle-frame, Figs. 6 and 7. Figs. 9 and 10 are views of modifications in the preparation of the blank of Fig. 1, hereinafter referred to.

In the drawings, A, Fig. 1, represents a blank, which, preferably, is made of wire of suitable length and diameter, or wire-gage, for the manufacture of a spectacle-frame of this invention. This blank A is of any suitable metal—such as silver, steel, gold, and preferably, and for reasons hereinafter stated, it is hollow or tubular from end to end; but it may be solid from end to end, or it may be solid or tubular for its central portion and solid or tubular for each end portion, all as will hereinafter appear.

B is the central portion of the blank A, and in Fig. 2 shown as bent into form for the nose-bridge C of a spectacle-frame, and D D are the opposite end portions of a blank, A, and forming, Figs. 4 and 5, the two lens-containing rims E.

Each end portion, D, Figs. 2, 3, 9, and 10, is sawed or split or otherwise divided longitudinally into separate branches *a b*, extending, Figs. 2 and 3, from the central portion, B, to near, and Fig. 9, to the extreme outer ends, and Fig. 10, also the length of the central portion, B, of the blank A. These separate branches *a b* of each end portion, D, Figs. 4, 5, 6, and 7, are opened out and bent or otherwise suitably formed into lens-rims E to contain the lenses, (not shown,) and also each with an ear-piece, *d*, for the joint and attachment of temples F. The ear-pieces *d* are at the outer ends and in the central line and direction of the longer axis of the lens-rims E.

In Fig. 4 both ear-pieces *d* are in one piece with both of the separate branches *a b* making the lens-rims E. In Fig. 5 one ear-piece is divided along its length, and in Figs. 6 and 7 both ear-pieces are divided along their length into separate pieces, each continuous with branches *a b* of the lens-rim, and both are fastened together by set-screws *f*, which, Figs. 6 and 7, act as stops or limits to the open swing of the temples F, jointed to the ear-pieces, as will hereinafter appear.

*g*, Figs. 6 and 7, is a socket-bearing on the ear-pieces *d* of the lens-rims, and *h* is a part of the temples to be secured to the socket-bearing *g*, the whole making a joint or hinge of the temples to the lens-rims. The socket-bearing $g$ is formed of a right-angular bend, $g^2$, of the ear-pieces $d$, centrally bored and receiving the bent end $g^3$ of the temple.

In the joint of the temples to the spectacle-frame the screws $f$, fastening together the divided ear-pieces $d$, are inside of the socket-bearings $g$ for the temples, and the jointed end $g^2$ of each temple has a curving bend, $g^3$, before referred to, outward from the joint to the front and thence between the screw $f$ and the outer end and to and back of the lens-rim, and this bend in the opening swing of the temple abuts against the screw $f$, arresting the further opening swing of the temple on the frame.

Splitting the ear-piece $d$ of the lens-rim E and joining its separate branches by a set-screw, $f$, as has been described, and as particularly shown, Figs. 5, 6, and 7, enables the lens-rim to be opened sufficiently for the better and easier insertion and removal of a lens.

Using a blank for making a spectacle or eyeglass frame, as has been described, which is a tube either seamed or seamless, secures when the blank is split or otherwise divided and opened out to make the lense-rims, as stated, a concave edge around the inner periphery of the lense-rim for the reception and seating of the lense therein, plainly an advantage over a solid blank, and again a further advantage in that it secures a lighter frame with all the required strength.

In case a tubular blank is used for the frame, the nose-bridge C, if so desired, can be stiffened and strengthened by the insertion of a core or filling, $C^2$, Fig. 2, of metal or other suitable material.

If the blank is split along its central portion, B, in branches continuous with the separate branches $a\ b$ of the end portions, as shown in Fig. 9, it is best to secure the central portion, B, against opening out as the end portions are bent, by means of clasping-bands $A^2$, applied at suitable parts of its length.

Spectacle and eyeglass frames made of blanks split or divided and in the manner otherwise, as has been described, have the number of their separate pieces reduced to the minimum, and require neither soldering nor brazing; and, again, as is plain, unskilled and untrained and cheap labor, as it may be classed, and also tools or machinery of the most simple construction and easy and ready operation or manipulation, can be employed.

Having thus described my invention, what I claim, and desire to secure by Letters Patent, is—

1. An improved mode of making frames for spectacles and eyeglasses, the same consisting in longitudinally dividing the opposite end portions, D, of a wire or other suitable blank into separate branches, opening out and bending said branches into rims to receive the lenses, and bending or otherwise shaping the central portion, B, of the blank for the nose-piece or bridge, substantially as described.

2. As an improvement in spectacle-frames, a joint consisting in the frame having a socket-bearing, $g$, made integral therewith, and a temple bent as at $g^3$, and having its end nearest the bent portion secured in said socket-bearing, substantially as described.

3. As an improvement in spectacle-frames, a joint consisting in the frame having a socket-bearing, $g$, made integral therewith, and a temple bent as at $g^3$, and having its end nearest the bent portion secured in said socket-bearing, in combination with an abutment, $f$, of the frame for the temple, substantially as described, for the purpose specified.

4. In spectacle-frames, a core, $C^2$, inserted in and filling the hollow or tubular nose-piece or bridge C of the frame, substantially as described, for the purpose specified.

In testimony whereof I have hereunto set my hand in the presence of two subscribing witnesses.

DANIEL O'HARA.

Witnesses:
ALBERT W. BROWN,
FRANCES M. BROWN.